United States Patent [19]

Steffen et al.

[11] 4,261,093
[45] Apr. 14, 1981

[54] TOOL AND METHOD FOR GAINING LEGITIMATE ENTRY INTO A LOCKED ENCLOSURE

[75] Inventors: Robert G. Steffen, Bluffton, Ind.; David L. Gregory, 1020 Union Park Dr., Orlando, Fla. 32817

[73] Assignee: David L. Gregory

[21] Appl. No.: 15,444

[22] Filed: Feb. 26, 1979

[51] Int. Cl.³ ............... B23B 35/00; B23B 51/04; B23P 19/00
[52] U.S. Cl. ............... 29/426.4; 408/1 R; 408/79; 408/204; 408/703
[58] Field of Search ............... 408/14, 201, 204, 209, 408/703, 79, 80, 82; 125/20; 29/402.03, 426.4

[56] References Cited

U.S. PATENT DOCUMENTS

| | | | |
|---|---|---|---|
| 2,484,150 | 10/1949 | Brown | 408/204 |
| 4,090,804 | 5/1978 | Haley | 408/204 X |

OTHER PUBLICATIONS

Deflanger Tool Advertisement, published by Role Tool Co. Inc., Orlando, Florida.

Primary Examiner—Z. R. Bilinsky
Attorney, Agent, or Firm—Gust, Irish, Jeffers & Hoffman

[57] ABSTRACT

A tool and method for cutting the housing of a lock assembly for gaining legitimate entry into a locked enclosure, the housing including an annular flange portion and receiving a lock mechanism having a lock trunnion. The trunnion is provided with a key-receiving slot and the lock mechanism is otherwise conventional.

The tool includes a blade for cutting the flange off said housing. An elongated pilot key element is provided with a journal mounted for rotation relative to said blade about the axis of rotation of the latter. The key element is disposed radially within the rotational path of the blade and is adapted to be received by the slot within the trunnion to serve as a locator for the blade. By reason of the journal connection between the key element and the blade, the key element serves as a rotational guide for the blade which causes the latter to follow a given circular path in cutting the aforesaid flange from the housing when the key element is inserted in the trunnion slot.

16 Claims, 18 Drawing Figures

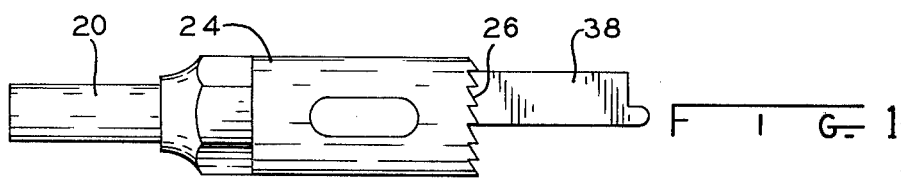
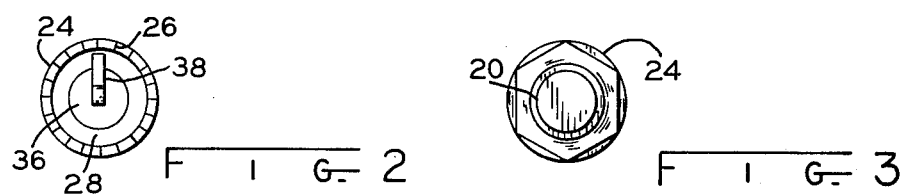
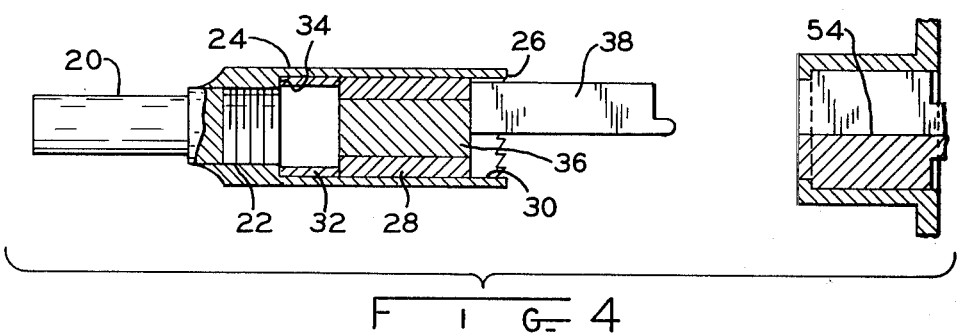
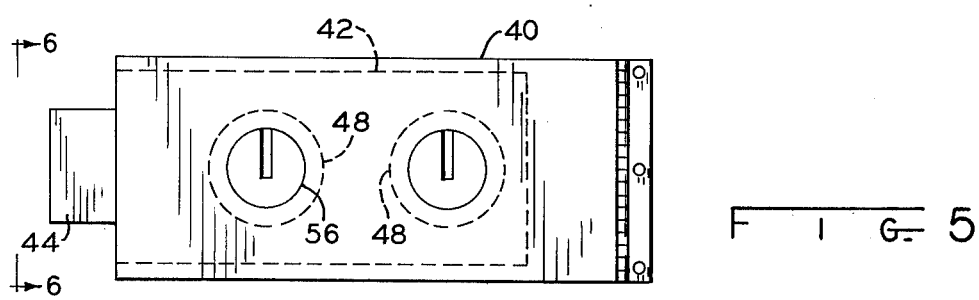
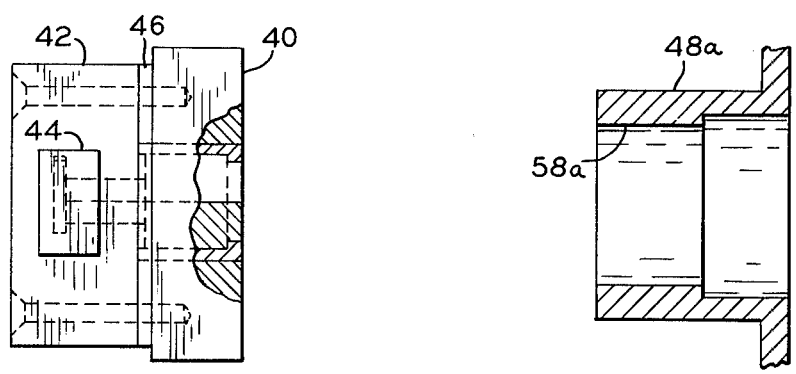

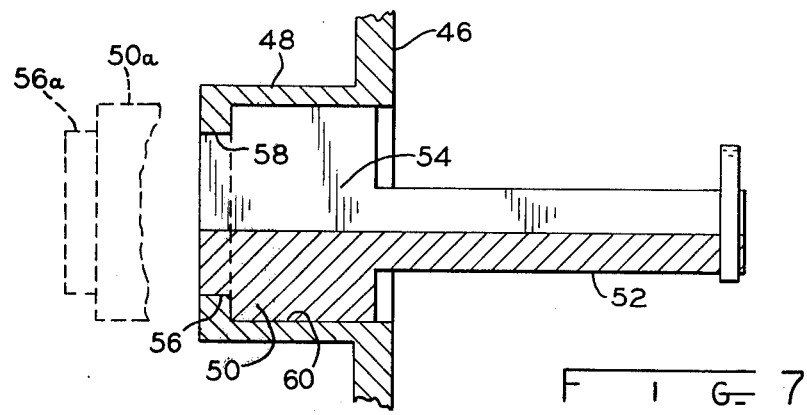
FIG. 7
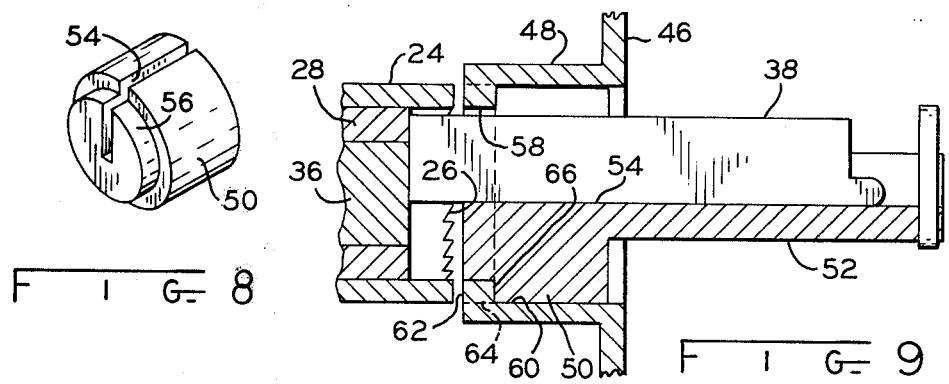
FIG. 8
FIG. 9
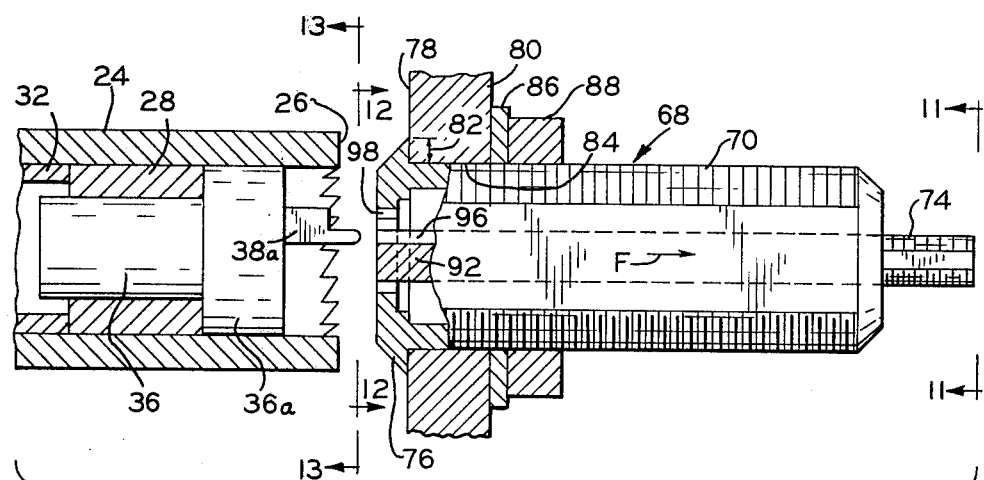
FIG. 10

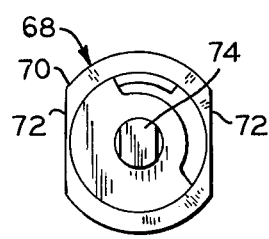 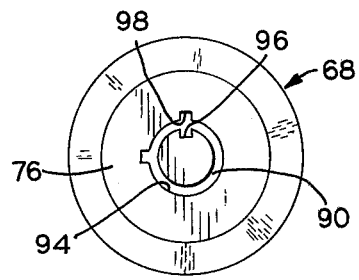
FIG. 11　　　　FIG. 12
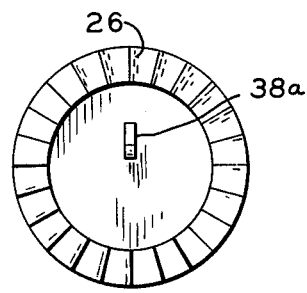 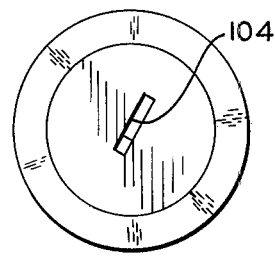
FIG. 13　　　　FIG. 16
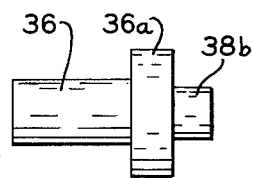 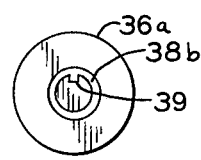
FIG. 14　　　　FIG. 15
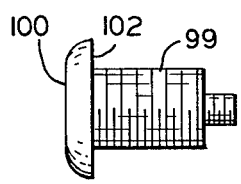
FIG. 17

TOOL AND METHOD FOR GAINING LEGITIMATE ENTRY INTO A LOCKED ENCLOSURE

BACKGROUND OF THE INVENTION

1. Field of the Invention

The present invention relates to the field of legitimate opening of locks and more particularly to a unique tool and method for removing locks from doors while they are locked.

2. Description of the Prior Art

Locks of sundry designs are conventionally removed to unlock a locked enclosure by means of tedious and time consuming techniques which normally employ drilling. Safety deposit locks usually employed in banks are of the double horn type requiring two keys, one being retained by the institution and the other by the customer. Often times the customer loses his key, whereupon it becomes necessary to hire the services of a locksmith for gaining entry to the enclosure, the usual technique employing the drilling of a number of holes in various locations which result in not only the destruction of the lock itself but also the door. In this instance, neither the door not the components of the locking assembly are reusable. Typical hole-cutting tools are disclosed in U.S. Pat. Nos. 2,779,361; 3,220,449; 3,559,513 and 3,448,126.

SUMMARY OF THE INVENTION

The present invention relates to a tool for cutting the housing of the lock assembly for gaining entry legitimately into a locked enclosure. The lock assembly includes a housing having an annular flange portion on one end, the housing receiving a lock mechanism which includes a conventional trunnion. The trunnion is provided with a key-receiving slot. The tool itself includes means having a rotatable blade for cutting an annulus of material from the housing and more particularly the flange therefrom. An elongated pilot key element is provided with a journal mounted for rotation relative to the blade about the axis of rotation of the latter. The key element is disposed radially within the rotational path of the blade and is adapted to be received by the slot thereby to serve as a locator about which the blade may rotate. Thus with the key element inserted in the slot, the blade can be registered with the flange on the lock housing, rotation of the blade cutting away the retaining portion of the flange.

In one form of lock, the flange projects radially outwardly from the housing, this flange serving to retain the lock in the door. Once the flange has been cut from the housing, the lock may be merely pushed through the opening in the enclosure in which the lock is mounted permitting the door to be opened. The lock mechanism is not itself damaged such that it may be inserted into a new housing and the lock then replaced in the door.

In another form, the lock has a radially inwardly turned flange which retains the lock trunnion in place. When this flange is removed from the housing, the trunnion and certain parts of the lock mechanism are merely drawn through the housing thereby permitting use of a simple rod-like tool for retracting the lock bolt in order to open the door. In this instance, the lock mechanism is merely assembled into a new housing and the assembly is reinserted into the door as before.

The method of this invention involves gaining ligitimate entry into a locked enclosure by removing a portion of the lock assembly and more particularly a radially extending flange on the housing thereof. The lock mechanism within the housing includes a trunnion having the usual ply-slot. The steps of the method include inserting a pilot key element into the slot, utilizing a portion of the key element as a journal mount for a rotatable cutter and rotating the cutter about the journal mount to cut the flange from the housing. As stated previously, the flange may extend either radially outwardly or inwardly, depending upon the type of lock employed.

It is an object of this invention to provide a tool and a method for gaining legitimate entry into a locked enclosure in a facile and economical manner by cutting away a retaining portion of the lock assembly.

The above-mentioned and other features and objects of this invention and the manner of attaining them will become more apparent and the invention will be best understood by reference to the following description of an embodiment of the invention taken in conjunction with the accompanying drawings.

BRIEF DESCRIPTION OF THE DRAWINGS

In the drawings,

FIG. 1 is a side view of one embodiment of the tool of this invention;

FIG. 2 is an end view thereof;

FIG. 3 is an opposite end view;

FIG. 4 is a longitudinal sectional view thereof;

FIG. 5 is a front view of a typical door which carries a lock mechanism that can be removed by the tool and method of this invention;

FIG. 6 is an end view of the door and lock assembly of FIG. 5;

FIG. 7 is a fragmentary longitudinal section view of one type of conventional locking mechanism showing the housing and trunnion in assembled relation;

FIG. 7a is a longitudinal sectional view of a different housing design which is adapted to receive the trunnion;

FIG. 8 is a perspective view of the trunnion only;

FIG. 9 is a view like FIG. 7 but with the cutting tool of FIGS. 1 through 4 in position to cut the flange from the lock housing preparatory to removing the lock;

FIG. 10 is a view similar to FIG. 9 of a different lock mechanism and a different tool for removing the same;

FIG. 11 is a view of one end of the lock of FIG. 10;

FIG. 12 is a view of the other end thereof;

FIG. 13 is an end view of the cutter of FIG. 10 taken substantially along section line 13—13 thereof;

FIG. 14 is a side view of a different pilot key element than shown in FIG. 10;

FIG. 15 is an end view of the key element itself;

FIG. 16 is a front view of another typical lock which can be removed according to this invention; and FIG. 17 is a side view of the lock of FIG. 16.

DESCRIPTION OF THE PREFERRED EMBODIMENT

Referring to the drawings, and more particularly FIGS. 1 through 4, the tool therein illustrated comprises an arbor 20 having an inner end 22 onto which is coaxially threaded a tubular, cylindrical cutter or saw 24. Serrations or cutting teeth 26 are provided on the annular, distal end of the cutter 24, the structure thus far described being conventional. The cutter 24 and more especially the teeth 26 are suitably hardened metal capable of cutting steel. While the teeth 26 are shown in the form of serrations, other metal-cutting elements such as conventionally used in the art of metal cutting art may be employed as will become apparent from the description that follows. The teeth 26 as a part of the cutter 24 may otherwise be in the form of a typical cutting tool or blade.

A sleeve, roller or ball type bearing 28 is fitted into the cylindrical cavity 30 within the cutter 24 and is held against leftward movement as viewed in FIG. 4 by a tubular spacer 32 engaged with one end of the bearing 28 and a shoulder or bottom 34 of the cavity 30.

Journaled in the bearing 28 is a stub shaft 36 which is coaxially disposed with respect to the arbor 20 and the cutter 24. An elongated, flat key element 38 is rigidly affixed at one end to the outer end of the stub shaft 36 to be disposed radially within the cutter 24 but to extend axially therebeyond. As appears in FIG. 4, the key element 38 is eccentrically mounted for a purpose which will become apparent from the description that follows.

As to the structure thus far described, the pilot key element 36, 38 is journaled within the cutter 24 such that the latter may be freely rotated about its axis while holding the pilot key element 36, 38 stationary. By reason of the radial position of the key element 38, which extends from close to the inner periphery of the teeth 26 toward the center, the cutter 24 may be rotated freely without interference from the key element 38.

This tool is especially adapted to cut open a lock with a minimum of damage and in a facile manner of the type shown in FIGS. 5 through 9. Referring first to FIGS. 5 and 6, these disclose a conventional door 40 of a safety deposit box having a conventional double horn lock assembly 42 mounted thereon. This lock assembly 42 includes a bolt 44 which is actuated by the usual tumblers and the remaining lock mechanism (not shown), this mechanism including a cover plate 46 having a protruding cylindrical housing 48 which slidably receives a nose or trunnion 50 therein, this trunnion 50 having the usual elongated tail bar 52 axially extending therefrom. As shown more clearly in FIGS. 7 and 8, the trunnion 50 is of cylindrical shape and is provided with the usual radially extending key slot 54. The outer end of the trunnion 50 has a stepped, reduced diameter end portion 56 which complements the shape of an annular flange 58 on the housing 48, which extends radially inwardly. The trunnion 50 is thereby held against outward or leftward movement as viewed in FIG. 7.

Utilization of the tool of this invention to open the lock holding the door 40 closed may now be explained with reference to FIGS. 4 through 9. A situation giving rise to a need for using the tool of this invention could involve the user's loss of his key and the unavailability of any other key with which the lock could be opened. In this event, and assuming that the bolt 44 of FIG. 5 is protracted so as to hold the door 40 closed, the pilot key 38 of the tool of FIGS. 1 through 4 is inserted into the key slot 54, the key element 38 being of a size and shape conforming to the usual key. This size and shape would substantially conform to that of the slot 54. With the key element 38 inserted into the slot 54 to a position as shown in FIG. 9, and the arbor 20 chucked in a hand drill, the cutter 24 is positioned in registry with the flange 58 of the housing 48. It should be stated at this point that the dimensions of the key 38 and cutter 24 are so selected that with the key element 38 in the slot 54 the cutter 24 and more particularly the toothed end or blade 26 is positioned in annular registry with that portion of the flange 58 corresponding to the the reduced diameter end 56 of the trunnion 50. In other words, again as viewed in FIG. 9, the outer periphery of the cutter 24 and the cutting teeth 26 are of a diameter coinciding substantially with the inner diameter 60 of the housing 48, this inner diameter 60 also corresponding to the outer diameter of the trunnion 50. With the tool so positioned, the hand drill (not shown) is acutated causing rotation of the cutter 24 about its axis. The stationary trunnion 50 within the lock holds the key element 38 stationary. The drill is moved forwardly to cause engagement of the cutting teeth 26 with the outer annular surface 62 of the flange 58 thereby cutting an annulus of material therefrom. This cutting operation is continued with the teeth 26 cutting into the flange 58 along the line indicated by the numeral 64 until the flange 58 is cut completely through as indicated by the numeral 66. The drill is then stopped and the tool including the key element 38 is withdrawn from the slot 54.

The front end of the trunnion 50 including the reduced end 56 are now fully exposed. It is only now necessary to grasp the reduced end 56 and withdraw the trunnion 50 along with the tail bar 52 from the housing 48. By use of a suitable tool resembling a screwdriver, the tumblers (not shown) inside the lock assembly may now be manipulated and the bolt 44 withdrawn from its latch. The door 40 may then be opened.

The only damage to the lock assembly as will now appear is the cutting off of the flange 58 from the housing 48. Since in the illustrated embodiment the housing 48 is an integral part of the lock cover 46, this will necessitate replacing these parts. Thus the assembly 42 is disassembled to the extent necessary and the lock mechanism including a new plate and housing 46, 48 is installed and the assembly 42 is then reattached to the door 40. The new lock assembly as mounted is then in readiness for customary operation with new keys which fit the particular locking mechanism.

A different housing 48a is shown in FIG. 7a wherein the flange 58a is a longer axial dimension. Since only the flange 58a and no more is to be cut away, it is necessary to use between the key element 38 and the journal 36 a spacer as indicated by the numeral 36a in FIG. 10 which is sized to limit inward movement of the teeth 26 a distance just sufficient to remove flange 58a, the length of bearing 28 and spacer 32 being correspondingly sized.

Another embodiment of this invention is shown in FIGS. 10 through 13 which is used in removing a slightly different lock assembly as indicated by the numeral 68. This lock assembly includes an elongated housing 70 threaded on its exterior. Two flat sides 72 are provided on the housing 68 along with the usual threaded mounting stud 74 which projects from the end thereof. The housing 68 is generally hollow except that the left hand end is closed by means of a flange 76. This flange 76 extends generally inwardly and outwardly radially of the wall of the housing 68 and is adapted to engage the outer surface 78 of the door 80 to be locked by the assembly 68. As clearly shown in FIG. 10, a portion of the flange 76 is indicated as engaging an annular surface portion 82 surrounding the unthreaded, lock-receiving opening 84 in the door 80.

A suitable washer 86 and nut 88 assembly is fitted over the housing 70 thereby securely clamping the housing 70 to the door 80 and within the opening 84.

As shown in FIG. 12, this particular lock assembly 68 utilizes a circular key which fits into a circular slot 90. This slot 90 is defined by the lock trunnion 92 in the central portion thereof and the opening 94 in the flange 76. This lock assembly 68 thus far described is of conventional construction and therefore needs no further explanation.

The lock-cutting tool used in gaining access to the lock 68 is generally the same as that illustrated in FIGS. 1 through 4 with the exception of those details described in the following. A cylindrical enlargement 36a, which serves as a depth gauge, is rigidly mounted or integral with the end of the stub shaft 36. A flat key element 38a is secured at its end to the enlargement 36a and projects radially and forwardly as shown to enter the key slot 96 in the trunnion 92. The key element 38a is sized to slidably fit with but little play the slot 96 in the trunnion 92 and the radially opposite slot 98 in the flange 76 thereby to position radially the cutting teeth 26 of the cutter 24. The cutter and teeth 24, 26 are so dimensioned that the inner periphery of the teeth 26 coincide with an imaginary coaxial extension of the opening 84 or may be slightly smaller than the opening 84. With the key element 38a inserted into the slots 96 and 98 as just explained, the tool is rotated as before by means of a hand held drill. The cutting teeth 26 is engaged with the outer surface of the flange 76 and an annulus of material is cut therefrom until that portion of the flange 82 engaged with the front surface 78 of the door 80 is entirely cut off. The depth gauge portion 36 prevents deeper cutting. The hand drill is then stopped and the cutting tool withdrawn from the slots 96 and 98. The lock 68 is now merely pushed through the opening 84 in the direction of the arrow F until it clears the opening 84. This permits the door 80 to be opened.

Since only the flange 76 of the housing 68 has been cut and none of the remaining portions of the lock mechanism have been affected, this same lock mechanism is installed in a new housing 68 and the lock assembly is then reinstalled in the door opening 84. The lock is then in readiness for customary use.

Instead of the key element being flat as indicated by the numeral 38a, it may be round as shown in FIGS. 14 and 15, this round key element being indicated by the numeral 38b. A radial projection 39 on the round key element 38b fits into that portion of the key slot which is in the trunnion 92 normally held stationary by the associated lock mechanism.

Another conventional lock design is shown in FIGS. 16 and 17 and comprises a threaded housing 99 having a fan plate 100 provided with a flange 102 and keyhole or slot 104. Assuming the tool of FIG. 10 to be of proper size, the key element may be inserted into the keyhole 104 to hold it stationary and the cutter 26 operated to cut the flange 102 away. The lock may then be easily pushed through the nonthreaded opening as in connection with the arrangement of FIG. 10.

As to both embodiments of this invention, it will be seen that a minimum of time and effort is required in removing the locks. Furthermore, the locks are only minimally damaged with almost all of the operating parts thereof being reusable. Only the housing part of the lock assemblies need to be replaced thus resulting in minimum costs as to parts replacement and repair service.

While there have been described above the principles of this invention in connection with specific apparatus, it is to be clearly understood that this description is made only by way of example and not as a limitation to the scope of the invention.

What is claimed is:

1. The method of gaining legitimate entry into a locked enclosure by removing a portion of a lock assembly, said lock assembly including a cylindrical housing having a radial flange, a lock trunnion within said housing, said trunnion having a key-receiving slot therein, said flange projecting radially inwardly to retain said trunnion within said housing, comprising the step of cutting through and removing said flange and stopping short of said trunnion thereby to release said trunnion for removal from said housing.

2. The method of claim 1 comprising the steps of holding a pilot key element into said slot, utilizing a portion of said key element against rotation by inserting it as a journal mount for a rotatable cutter, and rotating said cutter about said journal mount to cut said flange from said housing.

3. The method of claim 2 wherein said flange is on an exposed end of said housing and said trunnion is abutted against said flange to prevent withdrawal from said housing and including the step of withdrawing said trunnion from said housing after removal of said flange.

4. The method of gaining legitimate entry into a locked enclosure by removing a portion of a lock assembly, said lock assembly including a housing having on one end a radial retaining flange, said lock assembly having a key slot within said housing, comprising the steps of holding a pilot key element against rotation by inserting it into said slot, positioning a rotatable cutter on said key element in registry with said flange, rotating said cutter on said key element as a guide and cutting away at least a portion of said flange, and limiting the depth of cut to that required to just cut away said flange by engagement of a cutting depth abutment disposed within said cutter with the exposed end portion of said lock assembly thereby to remove the retaining portion of said flange.

5. The method of claim 4 wherein said flange projects radially outwardly from said housing, said housing being elongated, said housing and the lock mechanism therein being received by an opening in a door which is to be locked thereby with said flange abutting against the peripheral margin of said door about said opening, and including the steps of stopping short of cutting into said peripheral margin and pushing said housing and the lock mechanism therein through said opening after said flange has been cut away thereby to unlock said door.

6. The method of claim 4 wherein said lock assembly includes a trunnion having a radial shoulder on one end, said flange engaging said shoulder to retain said trunnion in place, and including the steps of cutting said flange in a region that removes such retaining engagement, and then manually withdrawing said trunnion from said housing.

7. For use in cutting the housing of a lock assembly for gaining legitimate entry into a locked enclosure, said lock assembly having a key-receiving slot and said housing including an annular flange portion:

a tool comprising an arbor, a cylindrical cutter having opposite ends and secured at one end portion to said arbor in coaxial relation therewith, an elongated key element journalled within said cutter for coaxial rotation relative thereto, said cutter having a cutting blade on the other end and said key element projecting longitudinally from within and between the ends of said cutter to beyond said blade, stop means fixedly secured relative to said key element for holding said key element against movement axially of said cutter in a direction extending from said other end toward said one end, said stop means including an abutment held against movement axially of said cutter in said direction and disposed within the cutter radially thereof a predetermined distance axially inwardly from said blade, whereby said blade projects axially beyond said abutment and said key element extends axially beyond said blade, and said key element having a portion eccentrically disposed relative to said cutter for holding said key element against rotation when inserted into the key slot of a lock assembly.

8. The tool of claim 7 wherein said cutter includes a cylindrical body, an annular bearing fitted into said body, said key element having a journal received by said bearing whereby said body may be rotated relative to said key element.

9. The tool of claim 8 wherein said stop means includes an annular spacer disposed between one end of said bearing and the bottom of a bearing-receiving cavity within said body, said bearing being in the form of a sleeve.

10. The tool of claim 8 wherein said body has a cylindrically shaped cavity, said journal being received within said cavity for rotation relative to said body.

11. The tool of claim 10 wherein said bearing is a sleeve coaxially received by and fitting into said cavity, said stop means including an enlarged cylindrical portion on said journal axially spaced within said blade, said key element being secured at one end to said enlarged portion, said enlarged portion being engageable with the outer end of said bearing and extending axially therebeyond a predetermined distance but spaced inwardly from said blade thereby to limit movement of said key element in the direction from said one cutter end toward the other and to provide a gauge which determines the depth of cut made by said blade.

12. The tool of claim 11 wherein said key-receiving slot is circularly shaped and is formed between a trunnion and face-plate extension of said flange, said trunnion having a radial key-way in the periphery, said key element being circular and having a radial projection thereon, said key element being sized to be slidably received by said circular slot with said radial projection being slidably received by said key-way, said enlarged portion having a surface axially spaced from said outer end of said bearing and being engageable with said face-plate extension as said blade cuts a predetermined depth into said flange.

13. The tool of claim 11 in which said bearing sleeve has opposite ends, a stop sleeve also received by and fitting into said cavity, said stop sleeve having one end engageable with the other end of said sleeve and its opposite end operatively engaged with a portion of said body.

14. The tool of claim 7 wherein said key element is eccentrically positioned relative to the axis of rotation of said cutter.

15. The tool of claim 7 for use in cutting a lock assembly having a generally flat key-receiving slot and wherein said key element is generally flat and conforming to the shape of said slot whereby insertion of said key element into said slot positions said blade in registry with said flange portion.

16. The tool of claim 7 for use in cutting a lock assembly having a generally circular key-receiving slot provided with a transverse notch portion and wherein said portion of said key element is shaped to fit into said notch portion when said blade is in registry with said flange portion.

* * * * *